United States Patent
Yorio

(10) Patent No.: US 8,814,477 B2
(45) Date of Patent: Aug. 26, 2014

(54) CONVEYOR TRAY APPARATUS WITH AIR BEARING AND AIR CURTAIN AND METHODS OF USE

(75) Inventor: John Anthony Yorio, Elmira, NY (US)

(73) Assignee: Corning Incorporated, Corning, NY (US)

( * ) Notice: Subject to any disclaimer, the term of this patent is extended or adjusted under 35 U.S.C. 154(b) by 60 days.

(21) Appl. No.: 13/576,468

(22) PCT Filed: Feb. 25, 2011

(86) PCT No.: PCT/US2011/026164
§ 371 (c)(1),
(2), (4) Date: Aug. 1, 2012

(87) PCT Pub. No.: WO2011/106592
PCT Pub. Date: Sep. 1, 2011

(65) Prior Publication Data
US 2012/0301229 A1 Nov. 29, 2012

Related U.S. Application Data

(60) Provisional application No. 61/308,640, filed on Feb. 26, 2010.

(51) Int. Cl.
*B65G 53/00* (2006.01)
*B65G 51/03* (2006.01)
*B65G 49/08* (2006.01)

(52) U.S. Cl.
CPC ............... *B65G 51/03* (2013.01); *B65G 49/08* (2013.01)
USPC .......................................................... 406/88

(58) Field of Classification Search
USPC ................................. 406/86, 87, 88; 414/676
See application file for complete search history.

(56) References Cited

U.S. PATENT DOCUMENTS

| 2,805,898 | A | | 9/1957 | Willis, Jr. | |
|---|---|---|---|---|---|
| 3,395,943 | A | * | 8/1968 | Wilde et al. | 406/88 |
| 3,473,910 | A | * | 10/1969 | Wilde et al. | 65/182.2 |
| 3,582,144 | A | * | 6/1971 | Woolard | 406/88 |
| 3,610,696 | A | * | 10/1971 | Fulton | 34/583 |
| 4,131,320 | A | * | 12/1978 | Volat et al. | 406/88 |
| 4,632,574 | A | * | 12/1986 | Wilson et al. | 384/12 |
| 5,130,067 | A | | 7/1992 | Flaitz et al. | 264/60 |
| 5,205,991 | A | | 4/1993 | Avery et al. | 422/129 |

(Continued)

FOREIGN PATENT DOCUMENTS

| CN | 1088178 | 6/1994 |
|---|---|---|
| CN | 1583531 | 2/2005 |

(Continued)

*Primary Examiner* — William R Harp
(74) *Attorney, Agent, or Firm* — Charles A. Greene; Matthew J. Mason

(57) ABSTRACT

Conveyor tray apparatus with air bearing and air curtain and methods of use are disclosed herein for use in manufacturing technical ceramics. The apparatus includes a tray body comprising a cradle having an outer surface disposed between opposing first and second sides, the cradle configured to receive a cylindrical object and having a plurality of air bearing holes. The tray body includes first and second support portions disposed at the respective first and second sides of the cradle. First and second air curtain housings are disposed on the respective first and second support portions. The air curtain housings each define an air plenum and an air exit opening that faces generally toward the outer surface of the cradle.

20 Claims, 7 Drawing Sheets

(56) References Cited

U.S. PATENT DOCUMENTS

| | | | |
|---|---|---|---|
| 5,406,058 A | 4/1995 | Lipp | 219/774 |
| 5,951,006 A * | 9/1999 | Biegelsen et al. | 271/195 |
| 6,455,826 B1 | 9/2002 | Araya et al. | 219/699 |
| 7,238,309 B2 | 7/2007 | Adriaansen et al. | 264/40.1 |
| 2007/0212174 A1 | 9/2007 | Hayashi et al. | 406/93 |

FOREIGN PATENT DOCUMENTS

| | | | |
|---|---|---|---|
| CN | 1948107 | 4/2007 | |
| DE | 8708816 | 6/1987 | C03B 35/04 |
| EP | 0525312 | 5/1992 | B65G 51/03 |
| JP | 2000/007151 | 1/2000 | |

* cited by examiner

CONVEYOR TRAY APPARATUS WITH AIR BEARING AND AIR CURTAIN AND METHODS OF USE

CROSS REFERENCE TO RELATED APPLICATION

This application claims the benefit of priority to U.S. Provisional Application No. 61/308,640, filed on Feb. 26, 2010.

FIELD

This disclosure relates to apparatus comprised of conveyor trays with air bearing and air curtain features, and methods of using the trays in the manufacture of technical ceramics, and in particular conveyor trays used in handling ceramic green ware or ceramic fired ware, such as honeycomb shaped articles formed via extrusion, that can be used for the treatment of combustion engine exhaust gases, for example, as a catalyst support substrate or filter.

BACKGROUND

Geometries and materials provide ceramic honeycomb structures with relatively high strength and durability after firing. However, the wet honeycomb extrudate produced earlier in the process is relatively quite soft and fragile, and can be difficult to handle or transport, particularly until the wet extrudate has been dried. Handling can cause shape distortion in wet honeycomb shapes, particularly those comprising thin web and/or skin structures, or where especially large and heavy extrudate sections need to be transported. Further, extrudate sections of large diameter or frontal area transverse to the axis of extrusion can be susceptible to distortion and collapse of the honeycomb channel structure as that structure must bear the weight and withstand the lateral weight shifts of the upper structure in the course of transport.

SUMMARY

Conveyor tray apparatus with air bearing and air curtain and methods of use are disclosed herein for use in manufacturing technical ceramics. As used herein, "air bearing" or "air curtain" are to be understood to function with gases other than air, such as nitrogen, and therefore "air bearing" and/or "air curtain" are interchangeable with "gas bearing" and "gas curtain", respectively. The methods and apparatus disclosed herein help to reduce structural distortion, such as channel collapse, that may be encountered during the handling of ceramic-forming or ceramic structures, such as wet green honeycomb extrudate.

DETAILED DESCRIPTION

While the methods and apparatus herein disclosed are suitable for use in a number of different manufacturing environments and production line layouts, they offer particular advantages for those production approaches wherein sections of wet honeycomb extrudate, termed "logs", are to be cut from the extruder, transported, and dried. Hence the following descriptions and illustrations may refer to the production and handling of such logs, particularly including logs of circular cylindrical cross-section, even though the use of the disclosed methods and apparatus are not limited thereto.

The ceramic structures can be processed by any of the known methods for fabricating ceramic monoliths, such as for example, by extrusion. The process may be either a batch process (as with a ram extruder), or a continuous process (as with a screw-type extruder). Regardless of the process, the batch material to be extruded is forced through the die of the extruder to form an extrudate, which in the case of a honeycomb die, is extruded in the form of a log. After leaving the extruder, the log is dried and fired using the apparatus and method of the invention.

Figure 1:
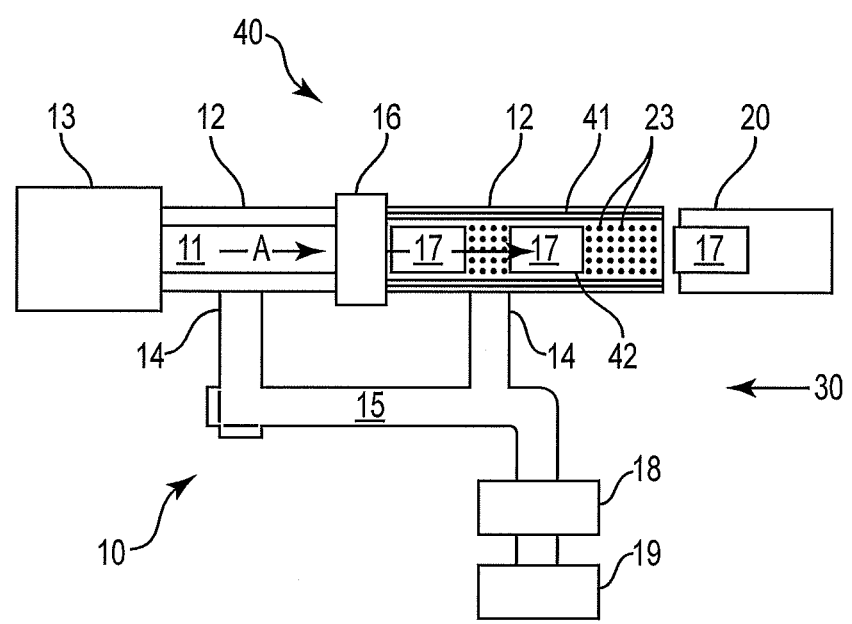
FIG. 1 depicts a top view of the gaseous fluid bearing and curtain (air bearing and air curtain) conveyor system used to convey a ceramic substrate from an extruder to a dryer carrier.
Figure 2:
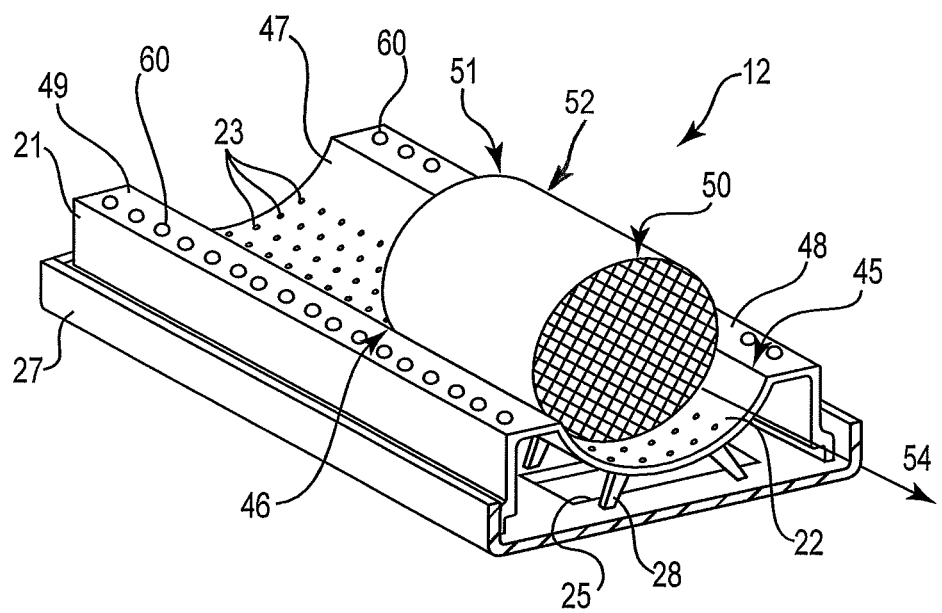
FIG. 2 schematically illustrates a perspective view of an embodiment of a tray body with air bearing holes and air curtain holes, shown without air curtain housings.

FIG. 1 shows a conveyor system 10. The conveyor system 10 comprises an air supply system 30 and a conveyor apparatus 40. A cylindrical object such as an extruded log 11 is directed over a guide path A (arrow) of the conveyor apparatus 40, after having left the extruder 13. The conveyor apparatus 40 comprises one or more tray bodies 12 and first and second air curtain housings 41, 42. The conveyor apparatus 40 facilitates transport of extrudate such as an extruded log 11, or pieces cut from such extrudate log such as the ceramic-forming, or ceramic, cylindrical objects 17. As seen in FIG. 2, cylindrical object 17 has opposing first and second end faces, 50, 51 a circumferential outer surface 52 extending between the first and second end faces 50, 51, and a longitudinal axis 54 extending through the first and second end faces 50, 51. After leaving the extruder 13, the ceramic log 11 is supported and conveyed upon an air bearing surface to a dryer carrier 20 into a dryer where the object 17 is exposed to a heated drying environment which can be a microwave energy environment created by for example, a microwave applicator. Before entering the dryer, the logs 11 can be cut into smaller ceramic structures or ware 17 which are then dried in the drying apparatus and eventually sintered or fired for subsequent processing or use.

Cradle 22 has a plurality of apertures 23 disposed therein, through which air is allowed to circulate or move freely through the tray body 12.

As seen in FIG. 2, each tray body 12 comprises a cradle 22 having opposing first and second sides 45, 46, and an outer surface 47 disposed between the first and second sides 45,46, the outer surface 47 being configured to receive the extruded log 11 or cylindrical object 17. The embodiment shown in FIG. 2 has an upwardly concave cradle 22 which is preferably contoured to fit the surface of the ceramic ware or structure 17. Cradle 22 has a plurality of air bearing holes 23 disposed through the outer surface 47 of the cradle 22. Tray 12 also comprises first and second support portions 48 and 49 each of which are provided with a plurality of air curtain holes 60. As seen in FIG. 1, one or more air conduits 14 supply the air bearing holes 23 and air curtain holes 60 with air, or other gas. The one or more conduits 14 can be connected to a common air supply pipe 15. A mechanical saw 16, whose velocity matches that of the extrudate exiting the extruder 13, e.g. log 11, is used to cut the log into pieces 17 of a desired (e.g. uniform) length. In some embodiments, air blower 19 and a humidifier 18, such as Model No. CES-012AS010-483 Chromalox electric boiler manufactured by Emerson Electric Co. (Pittsburgh, Pa.) and Model No. LB-10 manufactured by Electro-Steam Generator Corp. (Alexandria, Va.), are disposed in a common air supply pipe 15 upstream of the individual conduits 14, for maintaining the proper velocity and range of relative humidity for the air being supplied to the conveyor system 10.

Thus, conveyor apparatus 40 is provided for a cylindrical object 17 having opposing first and second end faces 50, 51, a circumferential outer surface 52 extending between the first and second end faces 50, 51, and a longitudinal axis 54 extending through the first and second end faces 50, 51. Conveyor apparatus 40 comprises a tray body 12 comprising a cradle 22 (the embodiment shown in FIG. 2 as being upwardly concave) having opposing first and second sides, and an outer surface 47 disposed between first and second sides 45, 46, outer surface 47 being configured to receive cylindrical object 17, cradle 22 having a plurality of air bearing holes 23 disposed through cradle 22, first support portion 48 being disposed at first side 45 of cradle 22, and second support portion 49 disposed at second side 46 of concave cradle 22.

Figure 3:
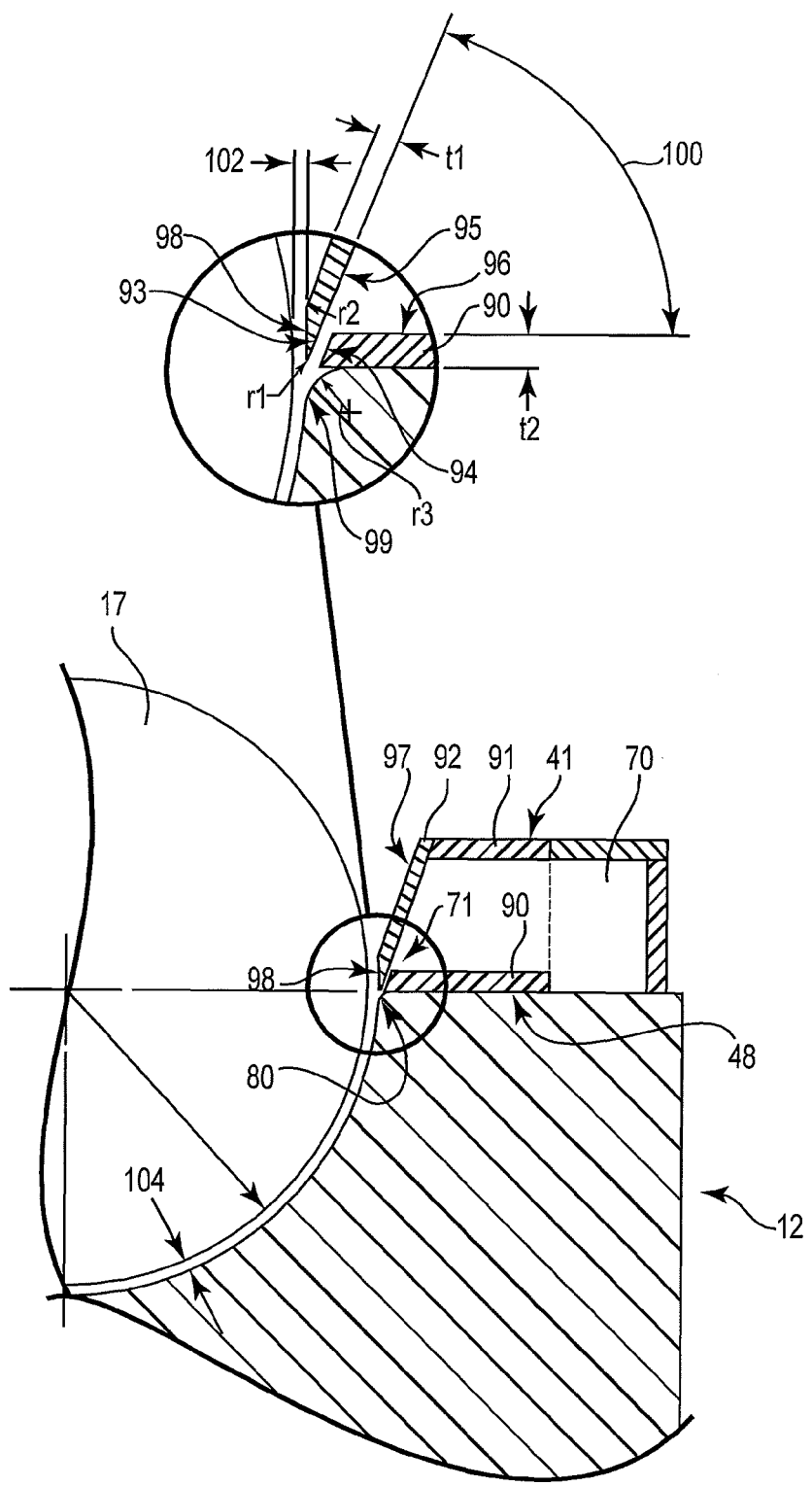
FIG. 3 schematically illustrates a transverse cutaway view, including an enlarged portion, of an embodiment of a tray body, shown with an air curtain housing.

As seen in FIGS. 1 and 3, first air curtain housing 41 is disposed on first support portion 48, first air curtain housing defining a first air plenum 70 and a first air exit opening 71, the first air exit opening 71 facing generally toward the outer surface 47 of the concave cradle 22 from the first side 45. Similarly, and preferably symmetrically, second air curtain housing (not shown) is disposed on the second support portion 49, the second air curtain housing defining a second air plenum and a second air exit opening, the second air exit opening facing generally toward the outer surface 47 of the concave cradle 22 from the second side 46.

As seen in FIG. 3, tray body 12 comprises a first rounded external surface 80 at an intersection of the outer surface 47 of the cradle 22 and the first support portion 48. Tray body 12 also comprises a second rounded external surface (not shown) at an intersection of the outer surface 47 of the cradle 22 and the second support portion 49. In some embodiments, the rounded external surface comprises a radius of less than 0.5 inch. In other embodiments, the rounded external surface comprises a radius r3 of between 0.05 inch and 0.5 inch. In other embodiments, the rounded external surface comprises a radius of between 0.15 inch and 0.35 inch.

As seen in FIG. 3, first air curtain housing 41 comprises a bottom portion 90, a top portion 91, and a proximal portion 92 extending between the top and bottom portions 91, 90, wherein the air exit opening 71 comprises an air curtain gap 93 between the proximal portion 92 and the bottom portion 90 of the first air curtain housing 41. The bottom portion 90 of the first air curtain housing 41 comprises a terminal surface 94 facing toward the proximal portion 92, and the proximal portion 90 of the first air curtain housing 41 comprises an inner surface 95 at least partially defining the first air plenum 70, wherein the terminal surface 94 of the bottom portion 90 and the inner surface 95 of the proximal portion 92 of the first air curtain housing 41 define the first air curtain gap 93. In some embodiments, the terminal surface 94 of the bottom portion 92 of the first air curtain housing 41 is disposed at an angle of 10 to 30 degrees with respect to an upper surface 96 of the bottom portion 90 of the first air curtain housing 41.

As shown in the embodiment of FIG. 3, the upper surface 96 of the bottom portion 90 of the first air curtain housing 41 can be generally horizontal, and the inner surface 95 of the proximal portion 92 of the housing 41 at the gas curtain gap 93 can then be disposed at an angle 100 of 10 to 30 degrees with respect to an upper surface 96 of the bottom portion 90 of the first air curtain housing.

As seen in FIG. 3, the proximal portion 92 of the first air curtain housing 41 can comprise an external surface 97, and at least part 98 of the external surface 97 of the proximal portion 92 is substantially tangential to a part 99 of the outer surface 47 of the cradle 22, i.e. the region closest to the interface portion 80.

As shown in the embodiment of FIG. 3, the proximal portion 92 of the first air curtain housing 41 comprises an external surface 97, and at least part 98 of the external surface 97 of the proximal portion 92 is substantially vertical.

The proximal portion 92 (and in some embodiments, a substantially vertical part 98) of the housing 41 is configured to be spaced away from the cylindrical object 17 by a cylindrical object-air curtain gap 102.

In some embodiments, the tray body 12 comprises an axial length, and in a transverse cross-section perpendicular to the direction of the axial length, the concave portion defines a circular arc (as shown in FIG. 3), or an oval or elliptical arc. In some embodiments, the tray body 12 is fabricated of at least one material exhibiting low dielectric loss. In some embodiments, the tray body 12 is fabricated of bonded alumina or aluminosilicate fiber.

Computer simulations were conducted for pressures and flows for a conveyor apparatus for a 5.66 inch diameter green ceramic honeycomb body having an outer skin (at radius 3.0594 inch) with a constant pressure in air bearing gap 104 (air bearing supply pressure) of 5 inches of water (0.1806 psig), wherein the ambient pressure is 0 psig, a 40 mil (0.040 inch) constant air bearing gap 104, a housing 41 with proximal portion 92 of thickness t1 of 0.125 inch, rounded tip of 0.01 inch radius r1, rounded edge of 0.5 inch radius r2 at the intersection of the part 98 and the remainder of portion 92, a bottom portion 90 of thickness t2 0.1875 inch with a gap 93 and a gap 102 each of 40 mils (0.040 inch), unless otherwise noted, the proximal portion 92 being at an angle 100 of 20 degrees, the bottom portion 90 being horizontal, and the tray body having a rounded edge 99 of 0.25 inch radius r3. Gap 102 was varied between 40 and 80 mils, and gap 93 was varied between 20 and 40 mils, while the air pressure in the chamber 70 was varied between 0 to 7.5 inches of water.

Figure 4:
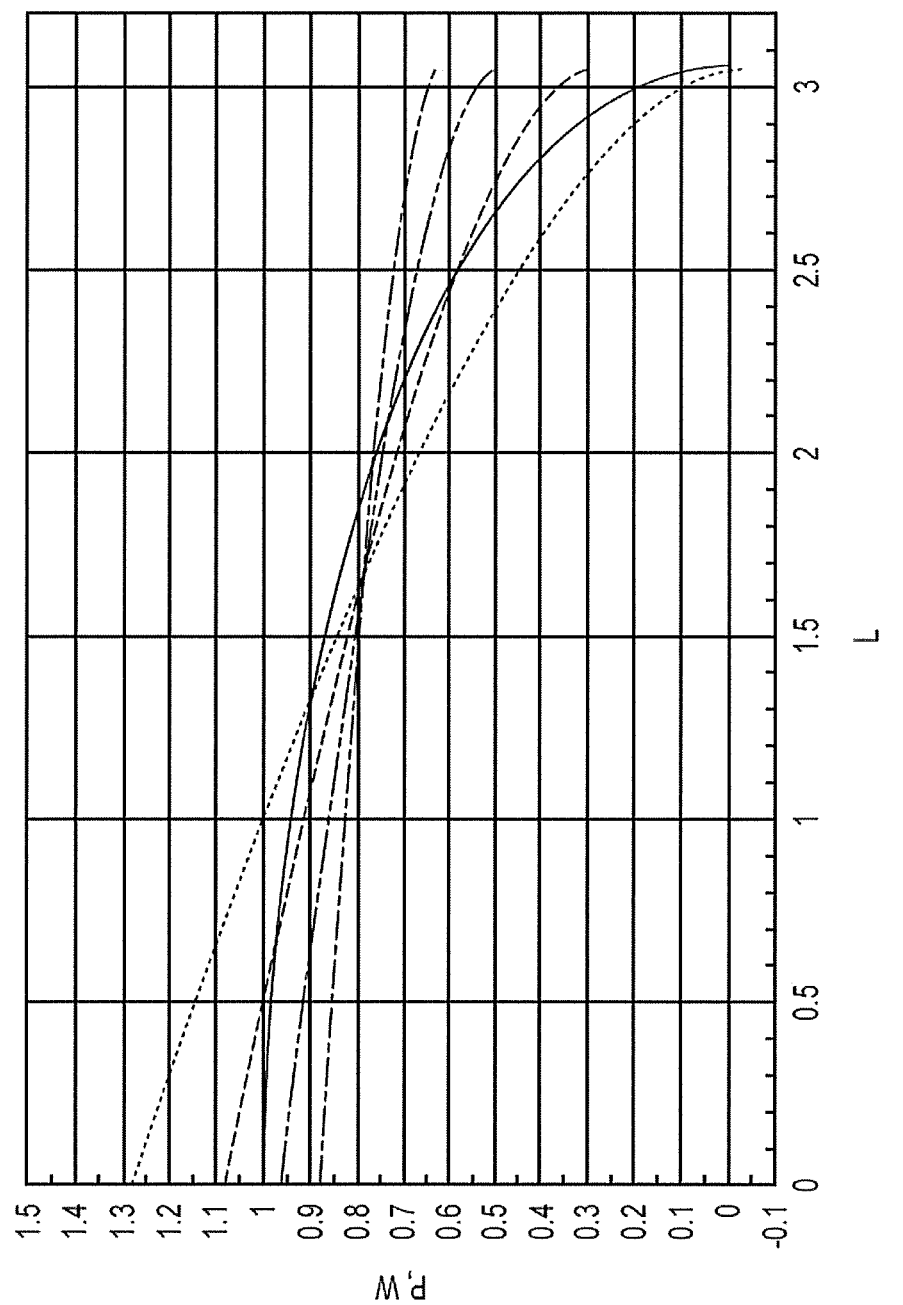
FIG. 4 is a graphical representation of modeled normalized pressure distribution for various air curtain chamber pressures.

FIG. 4 shows a graphical representation of the modeled normalized pressure and weight (P, W) of the supported cylindrical object plotted against the lateral distance in inches (L) i.e. the distance from vertical center line passing through the object in a transverse plane as shown in FIG. 3, wherein the air bearing gap 104 was 40 mils, the gap 102 between the air curtain and the object was 40 mil, and the gap 93 of the air curtain housing was 40 mil, and wherein the normalized weight of the object is shown in solid line, the pressure on the object with the air curtain housing in place, but with no flow coming out of the air curtain housing, shown by the small dashed line, and the pressure on the object with air curtain pressure in the chamber 70 was 2.5, 5.0, and 7.5 inches of water shown by the large dash line, the dash double dot line, and the dash single dot line, respectively. FIG. 4 illustrates that the air curtain can provide an enhanced shroud of air around the cylindrical object to help reduce the lateral motion of the cylindrical object with respect to the tray body, thereby helping to reduce damage of the cylindrical object by, for example, hitting the tray body during transport of the object. Also, the conditions represented by the small dashed line (air curtain housing in place, but with no flow coming out of the air curtain housing) indicates a weakening of the air bearing effect, and appears to indicate a propensity to lateral instability.

Figure 5:
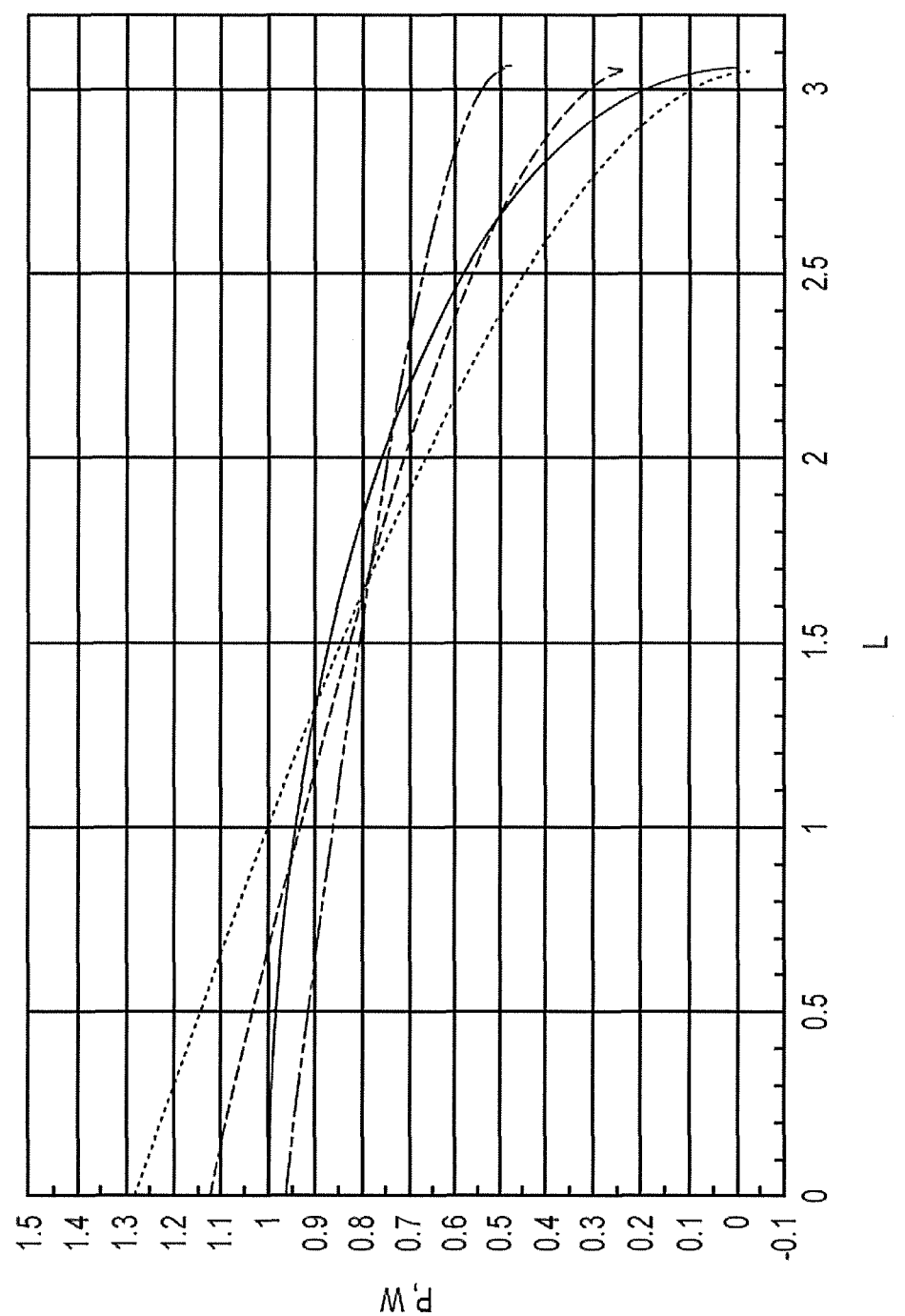
FIG. 5 is a graphical representation of modeled normalized pressure distribution for various air curtain exit gaps.

FIG. 5 shows a graphical representation of the modeled normalized pressure and weight (P, W) of the supported cylindrical object plotted against the lateral distance in inches (L) i.e. the distance from vertical center line passing through the object in a transverse plane as shown in FIG. 3, wherein the air curtain pressure inside chamber 70 was 5.0 inches of water, the air bearing gap 104 was 40 mils, and the gap 102 between the air curtain and the object was 40 mils, and wherein the normalized weight of the object is shown in solid line, the pressure on the object with the air curtain housing in place, but with no flow coming out of the air curtain housing, shown by the small dashed line, and the pressure on the object with the gap 93 of the air curtain housing being 20 mils or 40 mils, shown by the large dash line, and the dash double dot line, respectively. FIG. 5 illustrates that for a given air curtain chamber pressure, a wider air curtain gap 93 results in more air curtain flow which can provide an even more enhanced shroud of air around the cylindrical object to help reduce the lateral motion of the cylindrical object with respect to the tray body, thereby helping to reduce damage of the cylindrical object by, for example, hitting the tray body during transport of the object.

Figure 6:
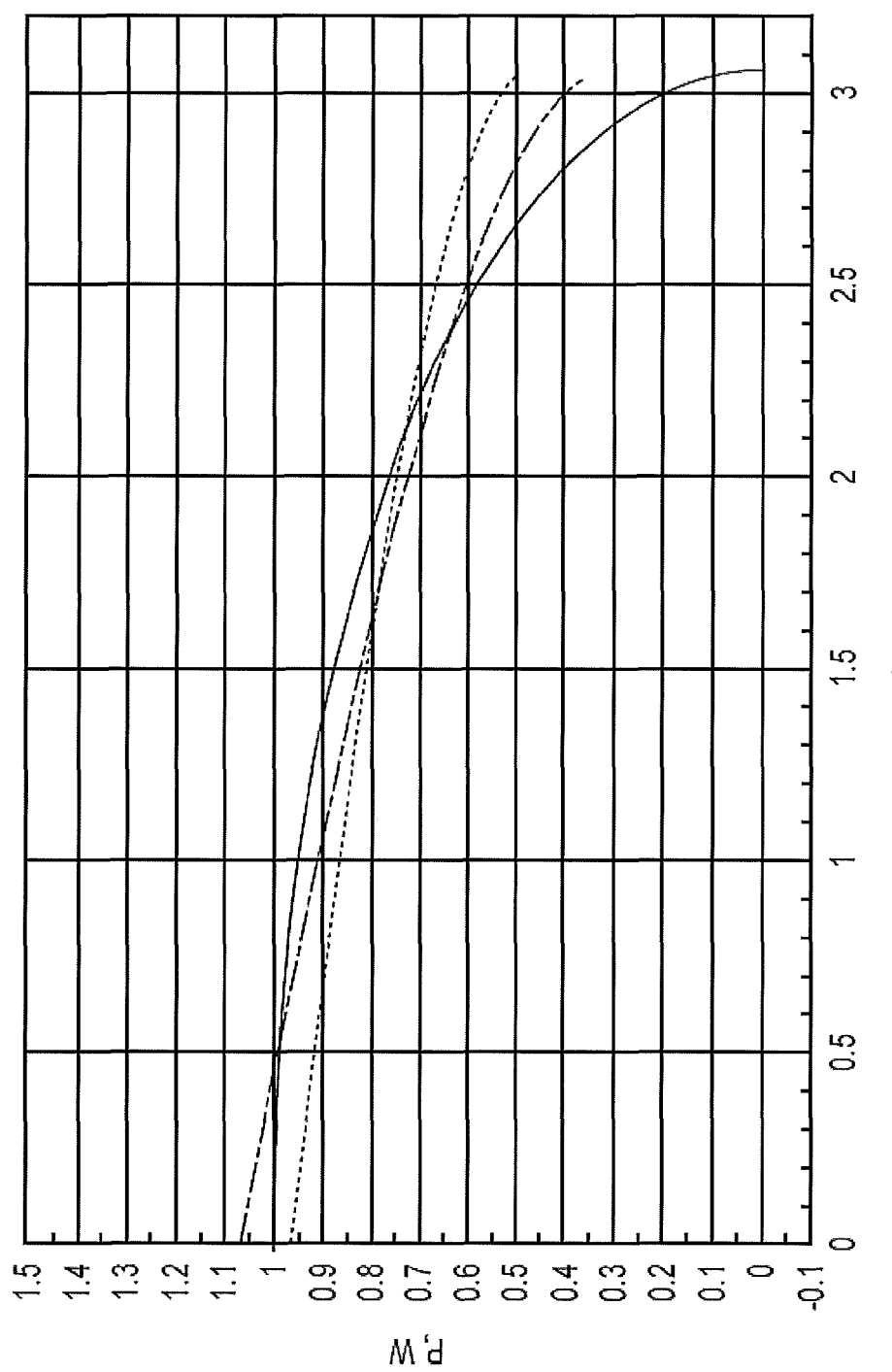
FIG. 6 is a graphical representation of modeled normalized pressure distribution for various gaps between air curtain and cylindrical object.

FIG. 6 shows a graphical representation of the modeled normalized pressure and weight (P, W) of the supported cylindrical object plotted against the lateral distance in inches (L) i.e. the distance from vertical center line passing through the object in a transverse plane as shown in FIG. 3, wherein the air curtain pressure inside chamber 70 was 5.0 inches of water, the air bearing gap 104 was 40 mils, and the gap 102 between the air curtain and the object was 40 mils, and wherein the normalized weight of the object is shown in solid line, and the pressure on the object with gap 102 between the air curtain housing and the cylindrical object being 40, 60 or 80 mils, shown by the small dash line, the large dash line, and the dash double dot line, respectively (the large dash line and the dash double dot line being essentially coincident with each other). FIG. 6 illustrates that for fixed air curtain geometry and chamber pressure, and with some variation in the gap 102 between the air curtain and the cylindrical object, the air curtain can still provide an enhanced shroud of air around the cylindrical object to help reduce the lateral motion of the cylindrical object with respect to the tray body, thereby helping to reduce damage of the cylindrical object by, for example, hitting the tray body during transport of the object.

Figure 7:
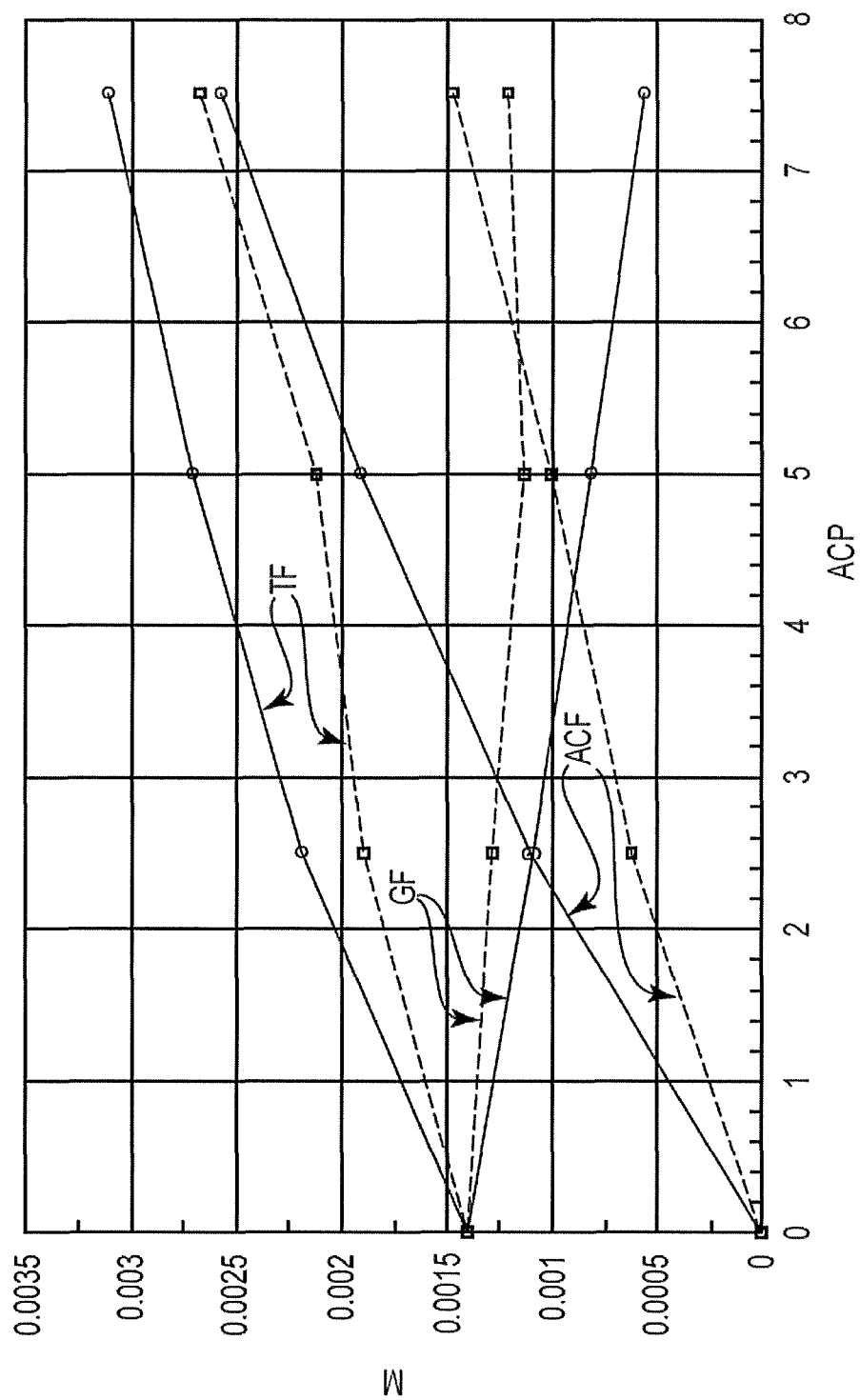
FIG. 7 is a graphical representation of modeled mass flow rates vs. air curtain supply pressure at various air curtain exit gaps.

FIG. 7 shows a graphical representation of the modeled mass flow rate (M), in lbm per second per inch, of the flow out of the air curtain through gap 93 ("AC flow" or "ACF"), the flow out of the gap 102 ("gap flow" or "GF"), and the total flow supplied to the air bearing plus air curtain and flowing out of the object-air curtain gap 102("total flow" or "TF"), each plotted against air curtain supply pressure, wherein the air curtain pressure inside chamber 70 (or "ACP") in inches of water, the air bearing gap 104 was 40 mils, and the object-air curtain gap 102 between the air curtain and the object was 40 mils, and the air bearing supply pressure was 5.0 inches of water, and wherein the flows corresponding to an air curtain exit gap 93 of 20 mils are shown by large dash lines, and wherein the flows corresponding to an air curtain exit gap 93 of 40 mils are shown by solid lines, the AC flow (ACF) being the lowest pair of solid & dashed lines, the gap flow (GF) being the middle pair of solid & dashed lines, and the total flow (TF) being the top pair of solid & dashed lines.

In use, air (or some other gas or combination of gases) is supplied to the air bearing holes with sufficient pressure to levitate the cylindrical object above the surface of the tray body 12, and air (or some other gas or combination of gases) is supplied to the air curtain holes with sufficient pressure to help reduce contact between the cylindrical object and the tray body 12 in a stable manner.

In other embodiments disclosed herein, a method is provided of conveying a cylindrical object 17 having opposing first and second end faces 50, 51, a circumferential outer surface 52 extending between the first and second end faces 50, 51, and a longitudinal axis 54 extending through the first and second end faces 50, 51, the method comprising: moving the object 17 into proximity with a tray body 12 such that the object 17 is disposed over the tray body 12; flowing a first gas up through the tray body 12 to suspend the object 17 above the tray body 12 such that the object 17 and the tray body 12 are spaced apart by a tray body-object gap 104; and flowing a second gas downward into the tray body-object gap 104. In some embodiments, the first and second gases are air. The second gas is directed into the tray body-object gap 104 along the circumferential outer surface 52 of the object 17. In some embodiments, the second gas is directed into the tray body-object gap 104 along the circumferential outer surface of the object simultaneously from locations on opposite sides 45, 46 of the tray body 12. In some embodiments, the tray body-object gap 104 is between 30 and 50 mils, and in some embodiments about 40 mils. In some embodiments, the gas is directed into the tray body-object gap 104 at a location about 90 degrees from vertical (see FIG. 3). In some embodiments, the gas is directed into the tray body-object gap 104 at an angle 100 of about 20 degrees with respect to horizontal. In some embodiments, the gas is directed into the tray body-object gap 104 from a gas curtain housing 41 disposed on the tray body 12.

The method can further comprise transporting the cylindrical object 17 into a dryer, and then a kiln.

In some embodiments, the air curtain gap 93, is 10 to 50 mils, and in some of these embodiments, 20 to 40 mils; in some of these embodiments, the air curtain gap 93 is a longitudinal slit in the tray body 12.

In some embodiments, the air curtain supply pressure in chamber 70 is 1 to 8 inches of water; in other embodiments, 2 to 7.5 inches of water; in other embodiments, 2.5 to 7.5 inches of water; and in some embodiments, about 5 inches of water.

In some embodiments, the air bearing supply pressure is 3 to 7 inches of water; in other embodiments, 4 to 6 inches of water; in other embodiments, about 5 inches of water.

In some embodiments, the mass flow rate through the air bearing holes is greater than 0.0005 lbm per second per inch; in some of these embodiments, the mass flow rate is 0.0005 to 0.0015 lbm per second per inch.

In some embodiments, the mass flow rate through the air curtain gap 93 is greater than 0.0005 lbm per second per inch; in some of these embodiments, the mass flow rate is greater than 0.001 lbm per second per inch; in some of these embodiments, the mass flow rate is 0.001 to 0.0025 lbm per second per inch.

In some embodiments, the mass flow rate of the total air flow passing through the object-air curtain gap 102 is greater than 0.0015 lbm per second per inch; in some of these embodiments, the mass flow rate is greater than 0.002 lbm per second per inch; in some of these embodiments, the mass flow rate is 0.002 to 0.003 lbm per second per inch.

In some embodiments, the object-air curtain gap 102 is 30 to 90 mils; in other embodiments, 40 to 80 mils; and in some embodiments, about 40 mils.

In some embodiments, the air curtain gap 93 is 10 to 50 mils; in other embodiments, 20 to 40 mils.

In some embodiments, the air bearing gap 104 is 10 to 70 mils; in other embodiments, 20 to 60 mils; in other embodiments, 30 to 50 mils; and in some embodiments, about 40 mils.

The cylindrical object can be comprised of ceramic-forming ingredients, and the cylindrical object can then be dried and fired to form a ceramic selected from the group consisting of cordierite, aluminum titanate, silicon carbide, mullite, spinel, alumina, silicon nitride, and combinations thereof.

The invention claimed is:

1. A conveyor apparatus for a cylindrical object having opposing first and second end faces, a circumferential outer surface extending between the first and second end faces, and a longitudinal axis extending through the first and second end faces, the apparatus comprising:
    a tray body comprising:
        a cradle having opposing first and second sides, and an outer surface disposed between the first and second sides, the outer surface being configured to receive the cylindrical object, the cradle having a plurality of air bearing holes disposed through the cradle;
        a horizontal first support portion disposed at the first side of the cradle;
        a second support portion disposed at the second side of the cradle;
    a first air curtain housing disposed on the first support portion, the first air curtain housing defining a first air plenum and a first air exit opening, the first air exit opening facing at a vertical angle to the first support portion generally toward the outer surface of the cradle; and
    a second air curtain housing disposed on the second support portion, the second air curtain housing defining a second air plenum and a second air exit opening, the second air exit opening facing generally toward the outer surface of the cradle.

2. The apparatus of claim 1 wherein the tray body comprises a first rounded external surface at an intersection of the outer surface of the cradle and the first support portion.

3. The apparatus of claim 2 wherein the tray body comprises a second rounded external surface at an intersection of the outer surface of the cradle and the second support portion.

4. The apparatus of claim 1 wherein the first air curtain housing comprises a bottom portion, a top portion, and a proximal portion extending between the top and bottom portions, wherein the air exit opening comprises an air curtain gap between the proximal portion and the bottom portion of the first air curtain housing.

5. The apparatus of claim 4 wherein the bottom portion of the first air curtain housing comprises a terminal surface facing toward the proximal portion, and the proximal portion of the first air curtain housing comprises an inner surface at least partially defining the first air plenum, wherein the terminal surface of the bottom portion and the inner surface of the proximal portion of the first air curtain housing define the first air curtain gap.

6. The apparatus of claim 5 wherein the terminal surface of the bottom portion of the first air curtain housing is disposed at an angle of 10 to 30 degrees with respect to an upper surface of the bottom portion of the first air curtain housing.

7. The apparatus of claim 5 wherein the inner surface of the proximal portion of the housing at the gas curtain gap is disposed at an angle of 10 to 30 degrees with respect to an upper surface of the bottom portion of the first air curtain housing.

8. The apparatus of claim 4 wherein the proximal portion of the first air curtain housing comprises an external surface, and at least part of the external surface of the proximal portion is substantially tangential to a part of the outer surface of the cradle.

9. The apparatus of claim 4 wherein the proximal portion of the first air curtain housing comprises an external surface, and at least part of the external surface of the proximal portion is substantially vertical.

10. The apparatus of claim 1 wherein a proximal portion of the housing is configured to be spaced away from the cylindrical object by a cylindrical object-air curtain gap.

11. The apparatus of claim 1 wherein the tray body comprises an axial length, and in a transverse cross-section perpendicular to the direction of the axial length, a concave portion defines a circular arc, part of an oval, or an elliptical arc.

12. A method of conveying a cylindrical object having opposing first and second end faces, a circumferential outer surface extending between the first and second end faces, and a longitudinal axis extending through the first and second end faces, the method comprising:
    moving the object into proximity with a tray body such that the object is disposed over the tray body;
    flowing a first gas up through the tray body to suspend the object above the tray body such that the object and the tray body are spaced apart by a tray body-object gap; and
    flowing a second gas downward at an angle with respect to horizontal into the tray body-object gap.

13. The method of claim 12 wherein the first and second gases are air.

14. The method of claim 12 wherein the gas is directed into the tray body-object gap along the circumferential outer surface of the object.

15. The method of claim 14 wherein the gas is directed into the tray body-object gap along the circumferential outer surface of the object simultaneously from locations on opposite sides of the tray body.

16. The method of claim 12 wherein the gas is directed into the tray body-object gap at a location about 90 degrees from vertical.

17. The method of claim 12 wherein the gas is directed into the tray body-object gap at an angle of about 20 degrees with respect to horizontal.

18. The method of claim 17 wherein the gas is directed into the tray body-object gap from a gas curtain housing disposed on the tray body.

19. The method of claim 12 further comprising transporting the cylindrical object into a dryer, and then a kiln.

20. The method of claim 12 wherein the cylindrical object is comprised of ceramic-forming ingredients, and the cylindrical object is dried and fired to form a ceramic selected from the group consisting of cordierite, aluminum titanate and silicon carbide.

* * * * *